(12) United States Patent
Pan et al.

(10) Patent No.: US 8,406,176 B2
(45) Date of Patent: Mar. 26, 2013

(54) TRANSMISSION METHOD AND DEVICE IN LONG TERM EVOLUTION TIME DIVISION DUPLEX SYSTEM

(75) Inventors: Xueming Pan, Beijing (CN); Shiqiang Suo, Beijing (CN); Hai Tang, Beijing (CN); Yingmin Wang, Beijing (CN); Yongbin Xie, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 293 days.

(21) Appl. No.: 12/738,292

(22) PCT Filed: Oct. 16, 2008

(86) PCT No.: PCT/CN2008/072725
§ 371 (c)(1),
(2), (4) Date: Jul. 9, 2010

(87) PCT Pub. No.: WO2009/052752
PCT Pub. Date: Apr. 30, 2009

(65) Prior Publication Data
US 2010/0278080 A1 Nov. 4, 2010

(30) Foreign Application Priority Data
Oct. 16, 2007 (CN) .......................... 2007 1 0175941

(51) Int. Cl.
*H04W 4/00* (2009.01)
*H04J 3/00* (2006.01)

(52) U.S. Cl. .......................... 370/328; 370/280; 370/329
(58) Field of Classification Search .................. None
See application file for complete search history.

(56) References Cited

U.S. PATENT DOCUMENTS
8,072,932 B2 * 12/2011 Sun et al. ...................... 370/330

FOREIGN PATENT DOCUMENTS
EP 1511190 A1 * 3/2005

OTHER PUBLICATIONS

Catt et al. "Numerology and Frame Structure of EUTRA TDD based on OFDMA and text proposal for TR 25.814" 3GPP TSG RAN WG1#42bis, R1-051241, San Diego, USA, Oct. 10-14, 2005, pp. 1-10.*

* cited by examiner

Primary Examiner — John Blanton
Assistant Examiner — Diane Lo
(74) Attorney, Agent, or Firm — Ladas & Parry, LLP

(57) ABSTRACT

A transmission method in a Long Term Evolution time division duplex system can carry out reconfiguration for half-frame structures. According to the coverage range requirements of the system, it performs flexible configuration of the number of special time slot areas and the downlink pilot time slots, guard intervals or uplink pilot time slots included therein, and so can support different coverage ranges. A base station and user terminal using above method in the Long Term Evolution time division duplex system.

15 Claims, 10 Drawing Sheets

--Prior Art--

--Prior Art--

--Prior Art--

TRANSMISSION METHOD AND DEVICE IN LONG TERM EVOLUTION TIME DIVISION DUPLEX SYSTEM

CROSS-REFERENCE TO RELATED APPLICATIONS

This application is a U.S. national stage application of the International Application No. PCT/CN2008/072725 filed Oct. 16, 2008, which claims priority to Chinese Application No. 200710175941.9 filed Oct. 16, 2007, the disclosures of which are hereby incorporated by reference in their entirety.

FIELD OF THE INVENTION

The present invention relates to the implementing of a Long Term Evolution Time Division Duplex (LTE TDD) system and particularly to a transmission method and device in a Long Term Evolution Time Division Duplex system.

BACKGROUND OF THE INVENTION

Currently, the third generation mobile communication system standardization organization, i.e. the 3rd Generation Partnership Project (3GPP), has initiated a Long Term Evolution (LTE) research project of 3G radio interface technologies. Along with development of the research, an LTE system has been designed to support two types of frame structures, i.e. frame structure types 1 and 2, the frame structure type 2 is preferably used in a radio frame for service transmission in an LTE TDD system.

A radio frame with the frame structure type 2 includes 2 half-frames, each of which consists of 7 normal time slots and one special time slot zone. The special time slot zone includes 3 special time slots, i.e., a Downlink Pilot Time Slot (DwPTS), a Guard Period (GP) for a switching point from a downlink time slot to an uplink time slot, and an Uplink Pilot Time Slot (UpPTS). The length of the GP limits directly a cell coverage radius. Currently, the DwPTS, GP, and UpPTS in a radio frame of the frame structure type 2 are fixed in length, thus a varying cell coverage area cannot be supported when the radio frame is used for service transmission.

SUMMARY OF THE INVENTION

In view of this, embodiments of the invention provide a transmission method and device in a Long Term Evolution Time Division Duplex (LTE TDD) system, which can support flexibly a varying cell coverage area.

A transmission method in an LTE TDD system according to an embodiment of the invention includes:

configuring the structure of a half-frame in a radio frame for service transmission so that the half-frame includes more than one normal time slot and at least one special time slot zone including a Downlink Pilot Time Slot, a Guard Period and an Uplink Pilot Time Slot;

determining the lengths of the Downlink Pilot Time Slot, the Guard Period and the Uplink Pilot Time Slot in the special time slot zone according to a required coverage area of the Long Term Evolution Time Division Duplex system to derive the radio frame for service transmission; and performing service transmission in the radio frame.

A base station in an LTE TDD system according to an embodiment of the invention includes:

a base station frame structure configuration module, configured to store predetermined configurations of a radio frame and determine the lengths of a Downlink Pilot Time Slot, a Guard Period and an Uplink Pilot Time Slot in a special time slot zone in the radio frame according to the predetermined configurations and a required coverage area of the Long Term Evolution Time Division Duplex system so as to derive the radio frame for service transmission, where, the predetermined configurations of the radio frame comprise such configuration information that each of half-frames of the radio frame for service transmission includes more than one normal time slot and at least one special time slot zone including the Downlink Pilot Time Slot, the Guard Period and the Uplink Pilot Time Slot;

a frame structure notification module, configured to notify a User Equipment of the lengths of the Downlink Pilot Time Slot, the Guard Period and the Uplink Pilot Time Slot in the special time slot zone; and a base station service transceiver module, configured to perform service transmission with the User Equipment in the radio frame.

A User Equipment in an LTE TDD system according to an embodiment of the invention includes:

a frame structure notification reception module, configured to receive the lengths of a Downlink Pilot Time Slot, a Guard Period and an Uplink Pilot Time Slot in a special time slot zone in a radio frame transmitted from a base station;

a User Equipment frame structure configuration module, configured to store predetermined configurations of the radio frame, and configure the stored predetermined configurations of the radio frame according to the lengths of the Downlink Pilot Time Slot, the Guard Period and the Uplink Pilot Time Slot in the special time slot zone in the radio frame received by the frame structure notification reception module so as to derive the radio frame for service transmission, where, the predetermined configurations of the radio frame comprise such configuration information that each of half-frames of the radio frame for service transmission includes more than one normal time slot and at least one special time slot zone including the Downlink Pilot Time Slot, the Guard Period and the Uplink Pilot Time Slot; and a User Equipment service transceiver module, configured to perform service transmission with the base station in the radio frame.

As can be apparent from the foregoing technical solutions, the transmission method and device in a Long Term Evolution Time Division Duplex (LTE TDD) system according to the invention reconfigure a half-frame structure of a radio frame for service transmission in the system so that a reconfigured half-frame includes more than one normal time slot and at least one special time slot zone for transmitting a Downlink Pilot Time Slot, a Guard Period and an Uplink Pilot Time Slot; and determine the lengths of the Downlink Pilot Time Slot, the Guard Period and the Uplink Pilot Time Slot in the special time slot zone according to a required coverage area of the system so as to determine a radio frame structure in the radio frame for service transmission; and the system performs service transmission in the determined radio frame.

As can be apparent, through reconfiguring the half-frame structure, the invention may configures flexibly the number of the special time slot zone(s), and the length of the Downlink Pilot Time Slot, the Guard Period or the Uplink Pilot Time Slot included in the special time slot zone(s) according to a required coverage area of the system, and thus support flexibly a varying coverage area.

DETAILED DESCRIPTION OF THE EMBODIMENTS

Figure 1:
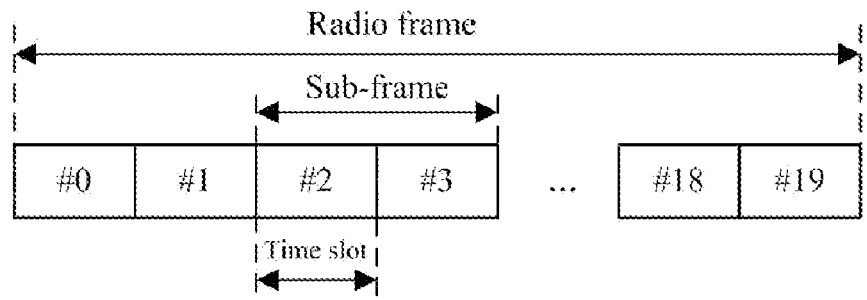
FIG. 1 is a schematic diagram of the frame structure type 1 defined for the LTE system.

As described previously, an LTE system is designed to support two types of frame structures, the frame structure type 1 is illustrated in FIG. 1 and applicable to Frequency Division Duplex (FDD) and Time Division Duplex (TDD) systems. As illustrated in FIG. 1, a radio frame with the frame structure type 1 has a length of 10 ms and consists of twenty time slots each with a length of 0.5 ms and identified with 0 to 19. Two consecutive time slots are defined as a sub-frame I which consists of the time slots $2i$ and $2i+1$, where i=0, 1 ... 9.

For the FDD system, an uplink and a downlink are separate in the frequency domain and each have 10 sub-frames available per 10 ms period; and for the TDD system, an uplink and a downlink share 10 sub-frames available per 10 ms period, and each of the sub-frames is allocated to either the uplink or the downlink, with the sub-frames 0 and 5 being typically allocated for downlink transmission.

Figure 2A:
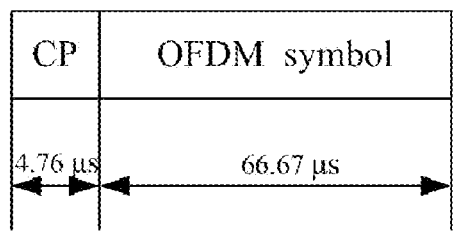
FIG. 2a is a schematic diagram of an OFDM symbol (accompanied with a short CP) in the frame structure type 1 in the prior art.
Figure 2B:
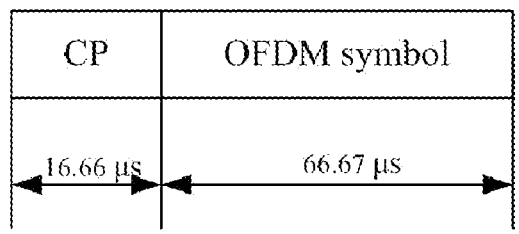
FIG. 2b is a schematic diagram of an OFDM symbol (accompanied with a long CP) in the frame structure type 1 in the prior art.

In the Orthogonal Frequency Division Multiplexing (OFDM)-based LTE system, an interval between sub-carriers is 15 kHz, and a corresponding OFDM symbol length is 66.7 µs. For the existing frame structure type 1, each time slot has a length of 0.5 ms. In the existing frame structure type 1, two Cyclic Prefixes (CP) with different lengths are defined to ensure anti-multipath performance of the system, where the CP lengths are configured to support different application scenarios: a short CP with a length of 4.76 µs is used to support a unicast service and an application with small coverage, in this case, a time slot consists of 7 OFDM symbols; while a long CP with a length of 16.66 is used to support a multi-cell broadcast service and an application with large coverage, in this case, a time slot consists of 6 OFDM symbols. Parameters of an OFDM symbol in the existing frame structure type 1 configured with the short CP is illustrated in FIG. 2a, and parameters of an OFDM symbol in the existing frame structure type 1 configured with the long CP are illustrated in FIG. 2b. As can be apparent from calculation, the CP overheads of the existing frame structure type 1 in the case of the short CP and the long CP are approximately 6.7% and 20%, respectively.

Figure 3:
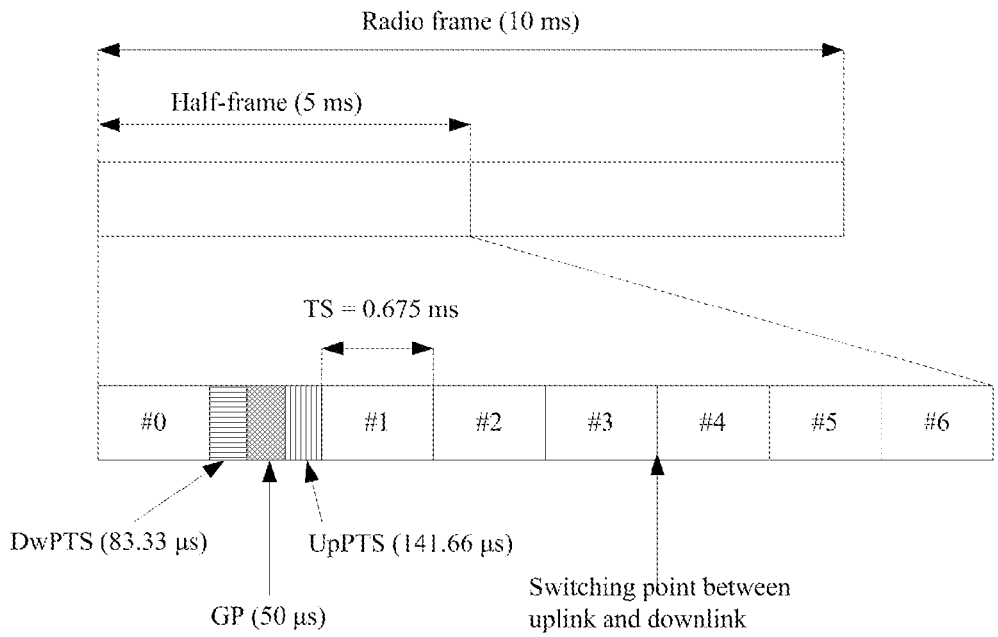
FIG. 3 is a schematic diagram of the basic frame structure type 2 defined for the LTE system.

The basic existing frame structure type 2 of a radio frame is as illustrated in FIG. 3. The radio frame with the frame structure type 2 is also 10 ms in length and split into two 5 ms half-frames, that is, the existing frame structure type 2 consists of 5 ms half-frames in unit, and each half-frame consists of 7 normal time slots TS0~TS6 (denoted by #0~#6 in FIG. 3) and one special time slot zone including 3 special time slots, i.e., a Downlink Pilot Time Slot, a Guard Period for a switching point from a downlink time slot to an uplink time slot and an Uplink Pilot Time Slot. A normal time slot is generally used for service transmission, and is also referred to as a service time slot which is a sub-frame. The sub-frame 0 and the Downlink Pilot Time Slot are typically used for downlink transmission, and the Uplink Pilot Time Slot and the sub-frame 1 are typically used for uplink transmission. In FIG. 3, each sub-frame includes a pair of switching points between uplink and downlink, where the downlink-to-uplink switching point is always positioned in the GP time slot, and the uplink-to-downlink switching point is configured between the two adjacent sub-frames TS3 and TS4.

In the OFDM-based LTE system, an interval between sub-carriers is 15 kHz, a corresponding OFDM symbol has a length of 66.7 µs and a sub-frame has a length of 0.675 ms. In the existing frame structure type 2, two Cyclic Prefixes with different lengths are defined to ensure anti-multipath performance of the system, where the CP lengths are configured to support different application scenarios: a short CP with a length of 8.33 µs is used to support a unicast service and an application with small coverage, in this case, a sub-frame consists of 9 OFDM symbols; and a long CP with a length of 17.71 µs is used to support a multi-cell broadcast service and an application with large coverage, in this case, a sub-frame consists of 8 OFDM symbols. Parameters of OFDM symbols in the existing frame structure type 2 configured with a short CP and a long CP are respectively similar to those in the frame structure type 1 as illustrated in FIGS. 2a and 2b except for the different short and long CP lengths of 8.33 µs and 17.71 µs. As can be apparent from calculation, the existing frame structure type 2 configured with the short CP and the long CP have CP overhead of approximately 11% and 21%, respectively.

As can be apparent in the OFDM system, the length of the Cyclic Prefixes limits the anti-multipath performance of the OFDM system. Long CP is advantageous in resistance against multipath interference but leads to a large overhead of the system, which may degrade the peak rate and transmission efficiency of the system and consequently the performance of data transmission.

Figure 4:
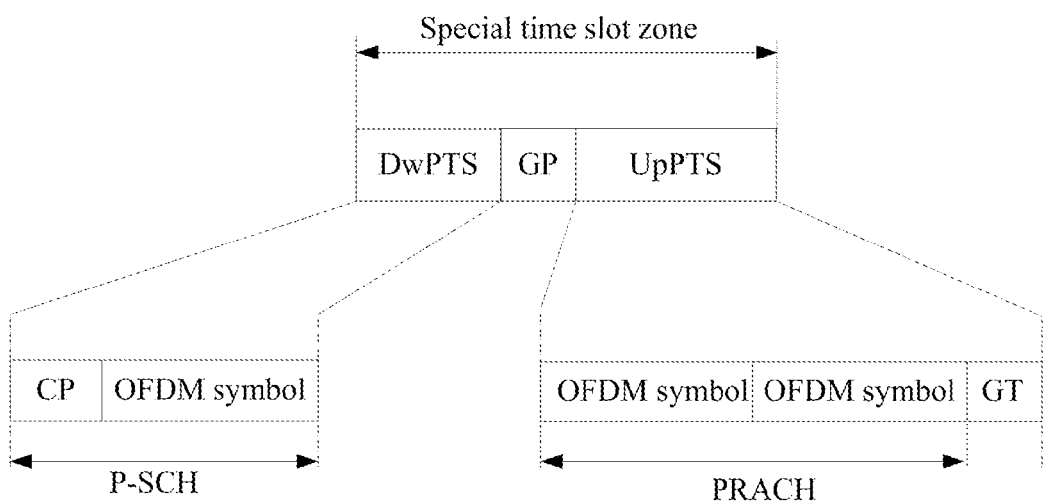
FIG. 4 is a schematic diagram of a special time slot zone configured in the frame structure type 2 in the prior art.

Currently, the DwPTS, GP and UpPTS in the existing frame structure type 2 have fixed lengths, i.e., 2560 Ts (which is 83.33 μs), 1356 Ts (which is 50 μs) and 4352 Ts (which is 141.67 μs) respectively. The special time slot zone in the prior art is configured as illustrated in FIG. 4, where the DwPTS includes one OFDM symbol with a long CP for signal transmission over a Primary-Synchronous Channel (P-SCH), and the UpPTS consists of 2 OFDM symbols and one Guard Time (GT) for signal transmission over a Physical Random Access Channel (PRACH), i.e., for random access by a user.

The cell coverage radius depends on the length of the GP directly, and the GP with a length of 50 μs can only support a coverage area with a radius of 7.5 km, thus the fixed length of the GP can not satisfy a varying cell coverage requirement. In order to satisfy a varying coverage requirement, a longer uplink-to-downlink Guard Period corresponding to a required coverage area is provided by making one or more consecutive uplink time slots idle at present. There are generally three different configurations including combination of the UpPTS and the GP to support a coverage area up to 30 km, combination of the UpPTS, TS1 and the GP to support a coverage area up to 120 km and even combination of the UpPTS, TS1, TS2 and the GP to support a coverage area above 120 km. Such configurations offer an inflexible support of a coverage area, for example, the frame structure has to be configured as a frame structure capable of supporting a coverage area up to 120 km even for a desired 50 km cell coverage area, which may waste a significant part of time slots as a Guard Period and consequently degrade the transmission efficiency.

As can be apparent in the prior art, the special time slot zone is fixed in both length and position, the GP with a length of 50 μs in the special time slot zone may support a small coverage area, and just the UpPTS, the combination of the UpPTS and TS1, or the combination of the UpPTS, TS1 and TS2 is to be used as the GP to support different larger coverage areas, which may lead to poor adaptation and degrade the transmission efficiency. Moreover, in the existing frame structures, the relatively long CP lengths may cause a considerable overhead during transmission and also consequently degrade the transmission efficiency.

In view of this, embodiments of the invention provide a transmission method and device in an LTE TDD system, which may support flexibly a varying cell coverage area. The objects, aspects and advantages of the invention will become more apparent through the detailed description of the invention given with reference to the drawings and embodiments.

The transmission method and device in an LTE TDD system according to the embodiments of the invention reconfigure a half-frame structure of a radio frame for service transmission in the system, so that a reconfigured half-frame includes more than one normal time slot and at least one special time slot zone for transmitting a Downlink Pilot Time Slot, a Guard Period and an Uplink Pilot Time Slot; and determine the lengths of the Downlink Pilot Time Slot, the Guard Period and the Uplink Pilot Time Slot in the special time slot zone according to a required coverage area of the system so as to determine a radio frame structure in the radio frame for service transmission, and the determined radio frame is used for service transmission in the system.

An aspect of the invention lies in the flexible configuring of the special time slot zone, and the frame structure with the flexibly configured special time slot zone may be used in a frame for service transmission. In a practical application according to the invention, the number and/or lengths and/or positions of the special time slot zone(s) may be configured flexibly. Particularly, there are at least two implementations of configuring a radio frame structure according to the invention as follows:

In one implementation, reconfiguration is performed in such a way that the CPs are shortened with reference to the existing frame structure type 1 and the special time slot zone is lengthened by the spare lengths obtained from shortening the CPs, so that the special time slot zone is longer than that in the existing frame structure type 1, thus configuring flexibly the Downlink Pilot Time Slot, the Guard Period and the Uplink Pilot Time Slot in the special time slot zone according to a required coverage area of the system.

In another implementation, reconfiguration is performed in such a way that not only the CPs are shortened with reference to the existing frame structure type 1, but also the number and lengths of the special time slot zone(s) and the normal time slots are reconfigured with reference to the existing frame structure type 1, so that the reconfigured special time slot zone is also longer than that in the existing frame structure type 2, thus configuring flexibly the Downlink Pilot Time Slot, the Guard Period and the Uplink Pilot Time Slot in the special time slot zone according to a required coverage area of the system.

The two implementations will be detailed below respectively in embodiments.

A First Embodiment

The present embodiment relates to the first implementation. In the existing frame structure type 2, the CPs are used for the protection against a multipath delay, but the currently prescribed CP lengths are not determined purely in view of a multipath delay but calculated for alignment with a 0.675 ms time slot. Practically, the CP with a length of about 5 μs in the existing frame structure type 1 may be sufficient to overcome an influence resulting from a multipath delay spread in a common channel environment.

Figure 5:
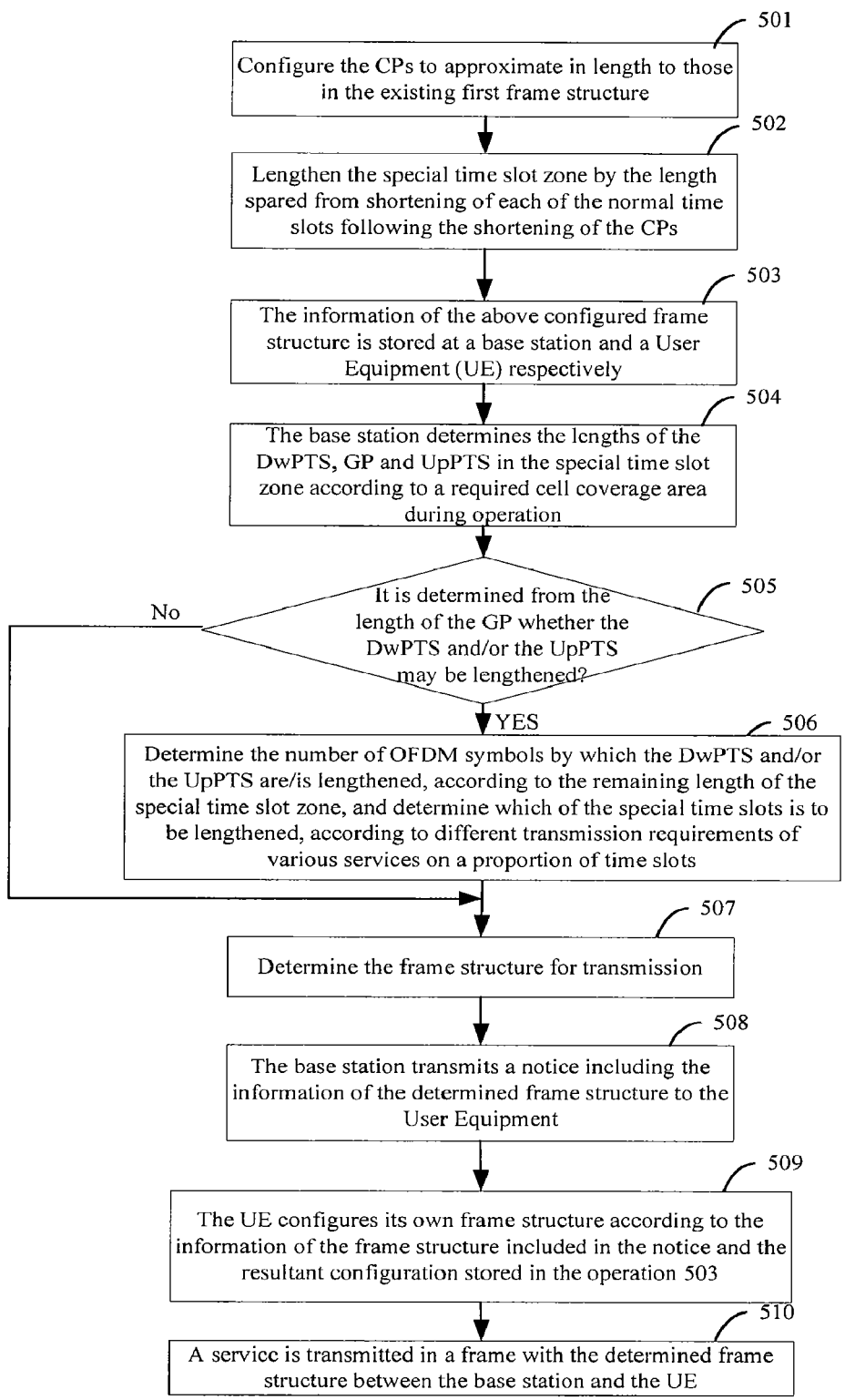
FIG. 5 is a schematic flowchart of a transmission method according to a first embodiment of the invention.

Based upon the foregoing principal, a half-frame structure is reconfigured in the first embodiment of the invention, a specific flow of which as illustrated in FIG. 5 includes the following operations.

Operation 501: The CPs are configured to approximate in length to those of the existing frame structure type 1.

In this operation, firstly, the short CP and the long CP in a half-frame may be assumed to be identical in length with those as prescribed in the existing frame structure type 1, and then the half-frame may be configured with seven normal time slots and one special time slot zone including DwPTS, GP and UpPTS, the OFDM symbol in the half-frame has a length of 66.67 μs, and the short CP and the long CP may be finely adjusted respectively so that the adjusted CPs typically differ from those in the existing frame structure type 1 by 0~1 μs.

Operation 502: The special time slot zone is lengthened by the length spared from shortening of each of the normal time slots following the shortening of the CPs.

Figure 6:
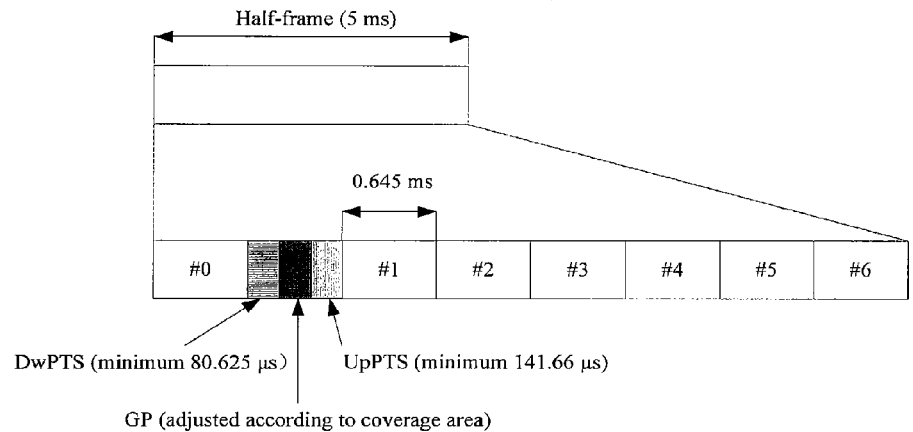
FIG. 6 is a schematic diagram of a half-frame structure configured in the embodiment illustrated in FIG. 5.

The half-frame structure thus configured is as illustrated in FIG. 6, which shows a schematic diagram of the half-frame structure configured in the embodiment illustrated in FIG. 5. As shown, the special time slot zone is 0.485 ms in length, each normal time slot is 0.645 ms in length, and each OFDM symbol has a length of 2048 Ts, i.e., 66.67 μs. Parameters of the frame structure are listed in Table 1.

TABLE 1

| | Length of normal time slot | Number of symbols | CP length | Length of special time slot zone |
|---|---|---|---|---|
| Short CP | 19800 Ts (0.6445 ms) | 9 | 152 Ts (4.95 μs) | 15000 Ts |
| Long CP | 19800 Ts (0.6445 ms) | 8 | 427 Ts (13.90 μs) | (488.28125 μs) |

Operation 503: The configurations of the above configured frame are stored at a base station and a User Equipment (UE) respectively.

Operation 504: The base station determines the lengths of the DwPTS, GP and UpPTS in the special time slot zone respectively according to a required cell coverage area during operation.

In this operation, the total length of the special time slot zone is maintained as 15000 Ts, i.e., 488.28125 μs, and the time slots of the DwPTS, GP and UpPTS are adjusted in length to satisfy a varying coverage requirement.

If the DwPTS is configured with the minimum length of 80.57 μs and the UpPTS is configured with the minimum length of 141.66 μs (the 8.33 μs GT is assumed), then the corresponding length of the GP is approximately 266 μs which may support a coverage area up to 40 km.

Operation 505: It is determined from the length of the GP whether the DwPTS and/or the UpPTS may be lengthened, and if so, then the flow goes to the operation 506; otherwise, the flow goes to the operation 507.

In the case of a small cell coverage area, the GP with a small length is required. Whether to lengthen the DwPTS and/or the UpPTS is determined from whether the total length of the special time slot zone minus the required lengths of the GP, DwPTS and UpPTS (i.e., the remaining length of the special time slot zone) is sufficient to add an OFDM symbol.

Operation 506: The number of OFDM symbols by which the DwPTS and/or the UpPTS are/is lengthened is determined according to the remaining length of the special time slot zone, and which of the special time slots (i.e., the DwPTS or the UpPTS or both) is to be lengthened depends on different transmission requirements of various services on a proportion of time slots.

Operation 507: The frame structure is determined for transmission.

There are at least four frame structures configured in the foregoing operations as follows.

In a first frame structure, the special time slots in the half-frame structure include the GP, and the non lengthened DwPTS and UpPTS.

Figure 7:
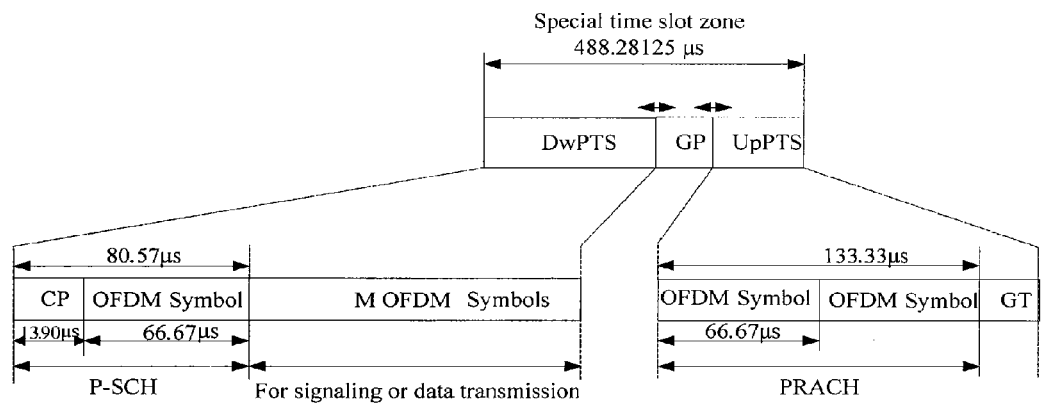
FIG. 7 is a schematic diagram of a second type of special time slot zone configured in the half-frame structure illustrated in FIG. 6.

In a second frame structure, only the DwPTS among the special time slots in the half-frame structure is lengthened as illustrated in FIG. 7 illustrating a schematic diagram of a second special time slot zone configured in the half-frame structure illustrated in FIG. 6. In FIG. 7, the DwPTS includes a number M (1≦M≦3) of OFDM symbols added after the OFDM symbol with a long CP for transmitting signals over the P-SCH, where the M OFDM symbols are used for transmitting downlink signaling or data.

In view of consistence with the P-SCH, long CPs are also used for the added OFDM symbols to reduce complexity of the system. In the frequency domain, the P-SCH part of the DwPTS is transmitted over a 1.25 MHz band centered in the bandwidth of the system, and the added part of the DwPTS may be transmitted over throughout the bandwidth. The added part of the DwPTS is scheduled together with the resource in the TS0.

Figure 8:
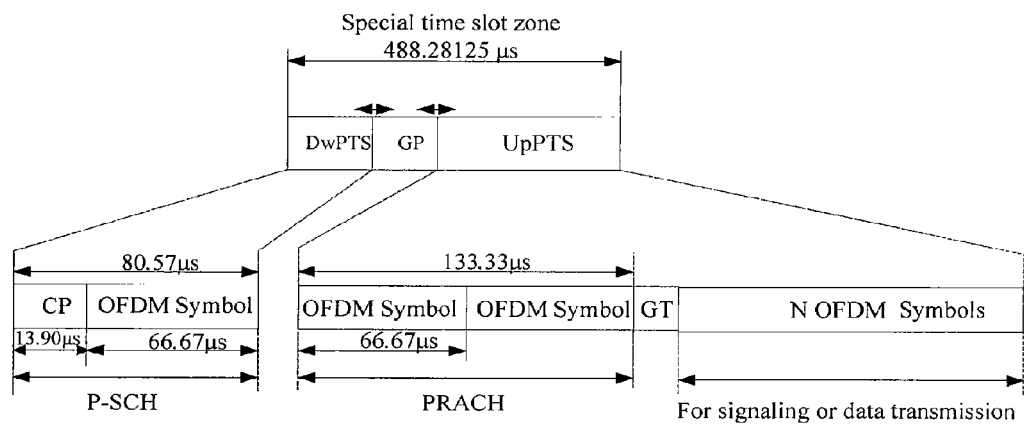
FIG. 8 is a schematic diagram of a third type of special time slot zone configured in the half-frame structure illustrated in FIG. 6.

In a third frame structure, only the UpPTS among the special time slots in the half-frame structure is lengthened. FIG. 8 illustrates a schematic diagram of a third special time slot zone configured in the half-frame structure illustrated in FIG. 6. In FIG. 8, the UpPTS includes a number N (1≦N≦3) of OFDM symbols added after the GT in addition to two OFDM symbols for transmitting signals over the PRACH, where the N OFDM symbols are used for transmitting uplink signaling or data.

In view of design consistence among the special time slots, long CPs are also used for the added OFDM symbols to reduce complexity of the system. The added part of the UpPTS is scheduled together with the resource in the TS1.

Figure 9:
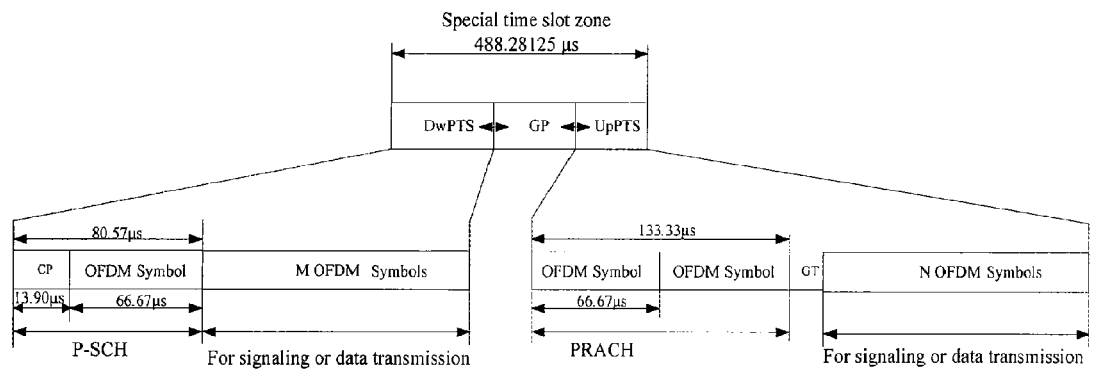
FIG. 9 is a schematic diagram of a fourth type of special time slot zone configured in the half-frame structure illustrated in FIG. 6.

In a fourth frame structure, the second and third structures are combined so that both the DwPTS and UpPTS among the special time slots in the half-frame structure are lengthened. FIG. 9 illustrates a schematic diagram of a fourth special time slot zone configured in the half-frame structure illustrated in FIG. 6. In FIG. 9, the DwPTS includes a number M of OFDM symbols added after the OFDM symbol for transmitting signals over the P-SCH, where the M OFDM symbols are for transmitting downlink signaling or data, and the UpPTS includes a number N (1≦M+N≦3) of OFDM symbols added after the GT in addition to two OFDM symbols for transmitting signals over the PRACH, where the N OFDM symbols are for transmitting uplink signaling or data. The added part of the DwPTS is scheduled together with the resource in the TS0, and the added part of the UpPTS is scheduled together with the resource in the TS1.

Operation 508: The base station transmits a notice including the information of the determined frame structure to the User Equipment.

The information of the frame structure in the notice includes patterns of time slots and structural configuration information of the special time slot zone.

Operation 509: The UE configures its own frame structure according to the information of the frame structure included in the notice and the resultant configurations stored in the operation 503.

Operation 510: A service is transmitted in a frame with the determined frame structure between the base station and the UE.

As can be apparent in the present embodiment, the CPs and thus each of the sub-frames are shortened to lengthen the special time slot zone while maintaining in length the 5 ms half-frame, so that the GP may be flexibly configured in length in the special time slot zone according to a required coverage area to thereby support flexibly a varying coverage area. Moreover, in the present embodiment, the DwPTS and/or the UpPTS in the special time slot zone may alternatively be lengthened by an additional length for transmitting signaling or data to thereby further improve the transmission efficiency.

A Second Embodiment

Figure 10:
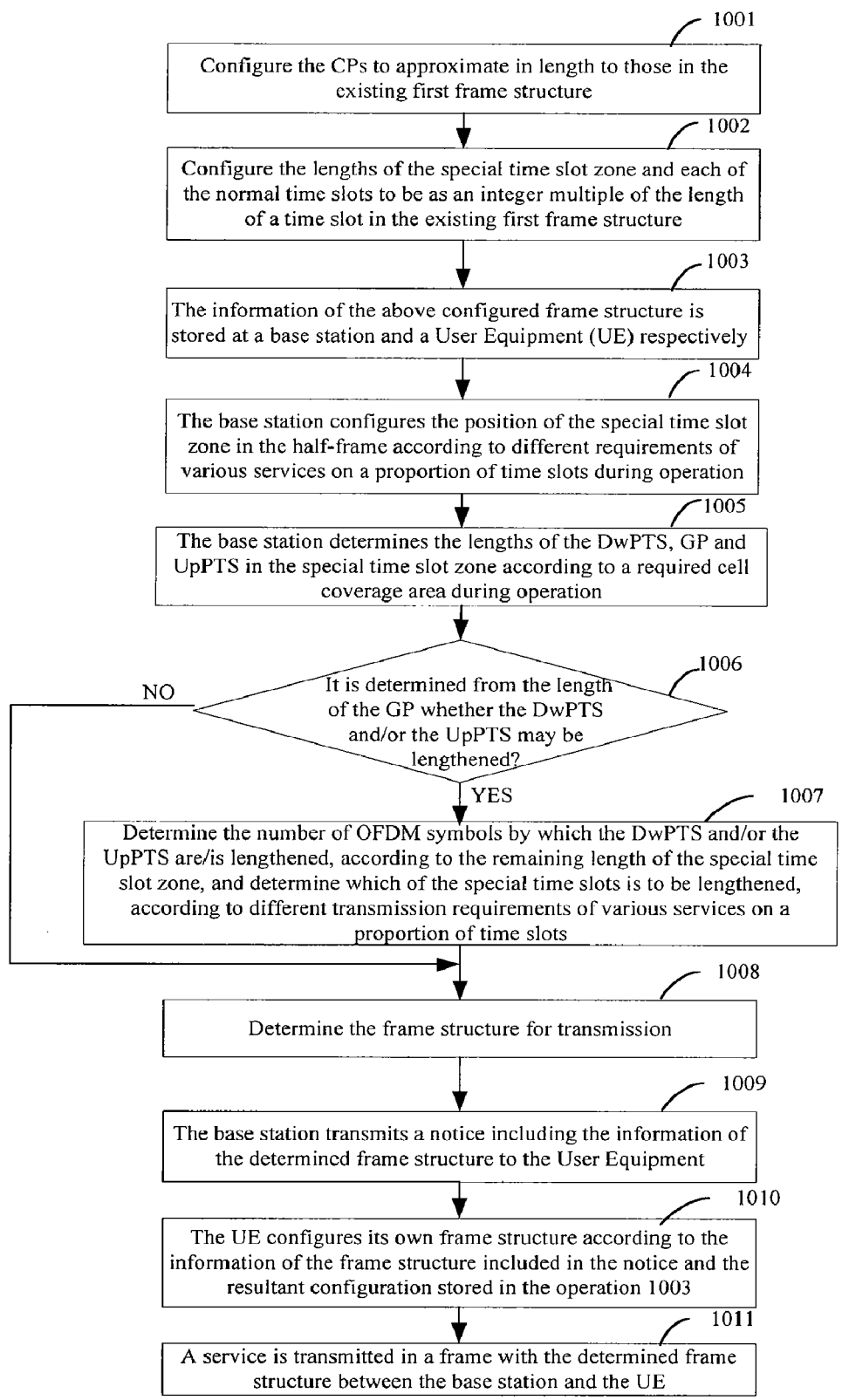
FIG. 10 is a flowchart according to a second embodiment of the invention.

The present embodiment relates to the second implementation. Reference is made to FIG. 10 illustrating a flow chart according to the second embodiment of the invention, which includes the following operations.

Operation 1001: The CPs are configured to approximate in length to those of the existing frame structure type 1 in the same way as the first preferred embodiment, and repeated descriptions thereof will be omitted here.

Operation 1002: The lengths of the special time slot zone and each of the normal time slots are configured to be as an integer multiple of (typically the same as or twice) the length of a time slot in the existing frame structure type 1, thus the special time slot zone is lengthened.

Operation 1003: The configurations of the above configured frame are stored at a base station and a UE respectively.

Operation 1004: The base station configures the position of the special time slot zone in the half-frame according to different requirements of various services on a proportion of time slots during operation.

Operation 1005: The base station determines the lengths of the DwPTS, GP and UpPTS in the special time slot zone according to a required cell coverage area during operation.

Operation 1006: It is determined from the length of the GP whether the DwPTS and/or the UpPTS may be lengthened, and if so, then the flow goes to the operation 1007; otherwise, the flow goes to the operation 1008.

Operation 1007: The number of OFDM symbols by which the DwPTS and/or the UpPTS are/is lengthened is determined according to the remaining length of the special time slot zone, and which of the special time slots is to be lengthened depends on different transmission requirements of various services on a proportion of time slots.

Operation 1008: The frame structure is determined for transmission.

Operation 1009: The base station transmits a notice including the information of the determined frame structure to the User Equipment.

The information of the frame structure in the notice includes patterns of time slots and structural configuration information of the special time slot zone.

Operation 1010: The UE configures its own frame structure according to the information of the frame structure included in the notice and the resultant configurations stored in the operation 1003.

Operation 1011: A service is transmitted in a frame with the determined frame structure between the base station and the UE.

In the present embodiment, various frame structures may be configured, four of which will be detailed below.

Figure 11:
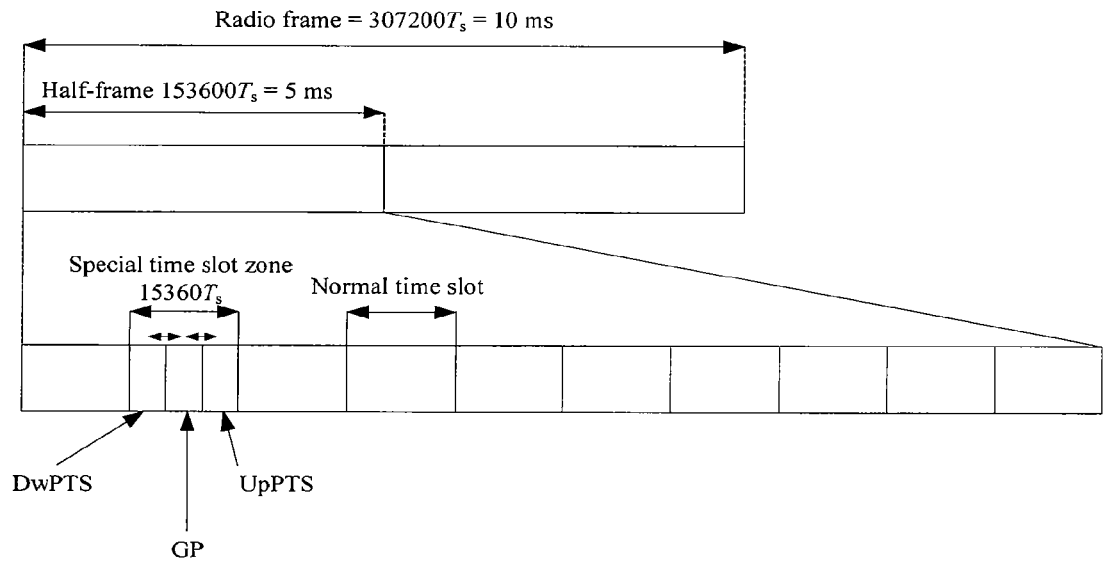
FIG. 11 is a schematic diagram of a first frame structure configured in the embodiment illustrated in FIG. 10.

Reference is made to FIG. 11 illustrating a schematic diagram of a first frame structure configured in the embodiment illustrated in FIG. 10. With reference to the existing frame structure type 1, the structure divides a 5 ms half-frame into 9 normal time slots with a length of 0.5 ms respectively and 1 special time slot zone also with a length of 0.5 ms. The special time slot zone consists of the three special time slots of DwPTS, GP and UpPTS. The position of the special time slot zone may be configured flexibly through upper level signaling to support a varying proportion of time slots.

In such configuration of the frame structure, a normal time slot includes 7 OFDM symbols with short CPs or 6 OFDM symbols with long CPs, specific parameters of an OFDM symbol are as depicted in Table 2.

TABLE 2

| | Length of normal time slot | Number of symbols | CP length | Length of special time slot zone |
|---|---|---|---|---|
| Short CP | 15360 Ts (0.5 ms) | 7 | For the $0^{th}$ OFDM symbol, CP = 160 Ts (5.40 μs) For the $1^{st}$~$6^{th}$ OFDM symbols, CP = 144 Ts (4.69 μs) | 15360 Ts (0.5 ms) |
| Long CP | 15360 Ts (0.5 ms) | 6 | 512 Ts (16.67 μs) | |

Figure 12:
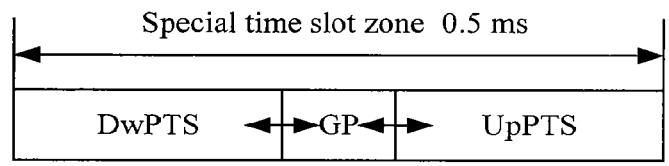
FIG. 12 is a schematic diagram of a special time slot zone configured in the frame structure illustrated in FIG. 11.

In such configuration of the frame structure, the structure of the special time slot zone is as illustrated in FIG. 12 illustrating a schematic diagram of the special time slot zone configured in the frame structure illustrated in FIG. 11, where the DwPTS, GP and UpPTS may be flexibly configured in length through upper level signaling to accommodate a varying coverage requirement while maintaining the total length of 0.5 ms of the special time slot zone.

In this case, under a condition of a small coverage area, the DwPTS and the UpPTS may be lengthened in the same way as the first preferred embodiment, and repeated descriptions thereof will be omitted here. Such frame structure is consistent with the existing frame structure type 1 illustrated in FIG. 1 due to the same number and lengths of the included time slots, and is easy to implement in a product.

Figure 13:
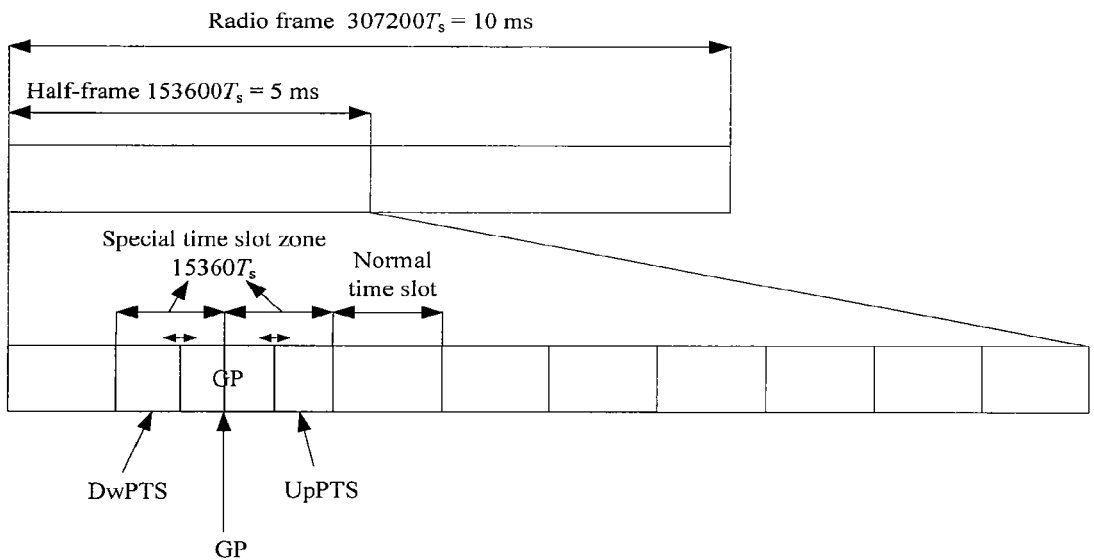
FIG. 13 is a schematic diagram of a second frame structure configured in the embodiment illustrated in FIG. 10.

Several normal time slots and two special time slot zones may be arranged in a half-frame with reference to the existing frame structure type 1, in order to support both a larger coverage area and more flexible configuration of a special time slot zone. For example, reference is made to FIG. 13 illustrating a schematic diagram of a second frame configured in the embodiment illustrated in FIG. 10, where a half-frame includes 8 normal time slots and 2 special time slot zones each with the same length as that of the normal time slot, i.e., 0.5 ms. Parameters in this scenario are similar to those of the first frame structure illustrated in FIG. 12 except for the different numbers of the normal time slots and of the special time slot zones, and repeated descriptions thereof will be omitted there.

Figure 14:
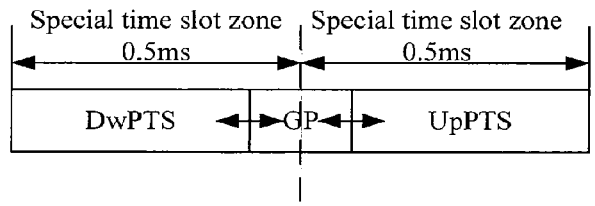
FIG. 14 is a schematic diagram of a special time slot zone configured in the frame structure illustrated in FIG. 13.

In such configuration of the frame structure, the structures of the special time slot zones are as illustrated in FIG. 14 illustrating a schematic diagram of the special time slot zones configured in the frame structure illustrated in FIG. 13, where the first 0.5 ms special time slot zone includes the DwPTS and one half of the GP, and the second 0.5 ms special time slot zone includes the other half of the GP and the UpPTS. In practice, both of them may be regarded as one special time slot zone to configure the DwPTS, GP and UpPTS according to a required coverage area.

Figure 15:
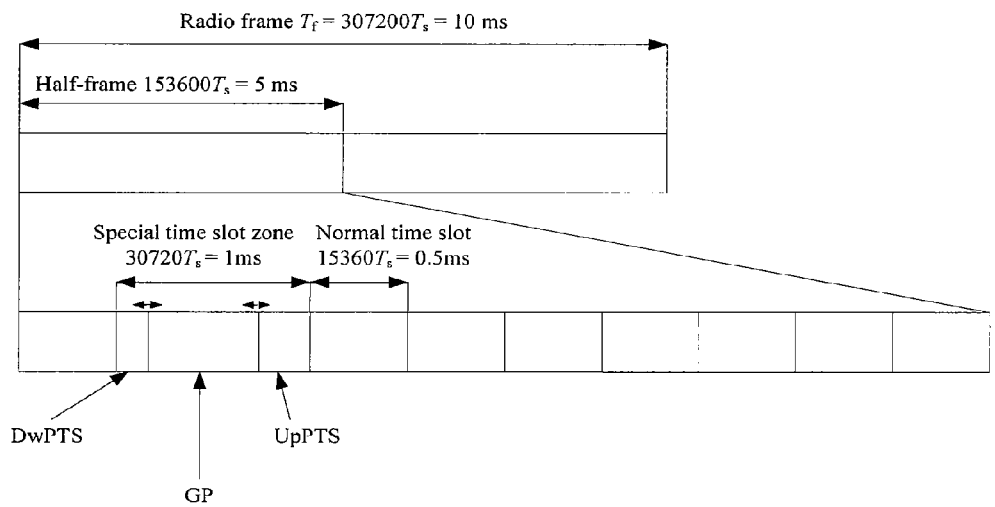
FIG. 15 is a schematic diagram of a third frame structure configured in the embodiment illustrated in FIG. 10.

Reference is made to FIG. 15 illustrating a schematic diagram of a third frame configured in the embodiment illustrated in FIG. 10. In such configuration, each half-frame includes 8 normal time slots and one special time slot zone with a different length from that of the normal time slot. As illustrated in FIG. 15, a 5 ms half-frame is divided into 8 normal time slots with a length of 0.5 ms and one special time slot zone with a length of 1 ms. The special time slot zone consists of three special time slots of DwPTS, GP and UpPTS. The position of the special time slot zone may be configured flexibly through upper level signaling to support a varying proportion of time slots. Practically, the special time slot zone may be further lengthened for a larger required coverage area, for example, lengthened to be as n×0.5 ms, and thus the number of the normal time slots is 10−n, where 2≦n≦10. Parameters in this scenario are similar to those of the first frame structure illustrated in FIG. 12 except for the different number of the normal time slots and the different length of the special time slot zone, and repeated descriptions thereof will be omitted there.

Figure 16:
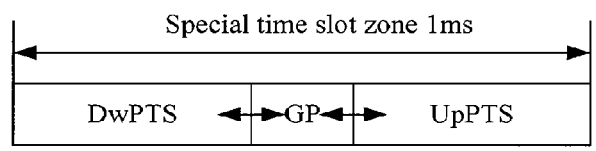
FIG. 16 is a schematic diagram of a special time slot zone configured in the frame structure illustrated in FIG. 15.

In such configuration of the frame structure, the structure of the special time slot zone is as illustrated in FIG. 16 illustrating a schematic diagram of the special time slot zone configured in the frame structure illustrated in FIG. 15. As illustrated in FIG. 16, the DwPTS, GP and UpPTS are configured in the special time slot zone with a length of 1 ms.

Figure 17:
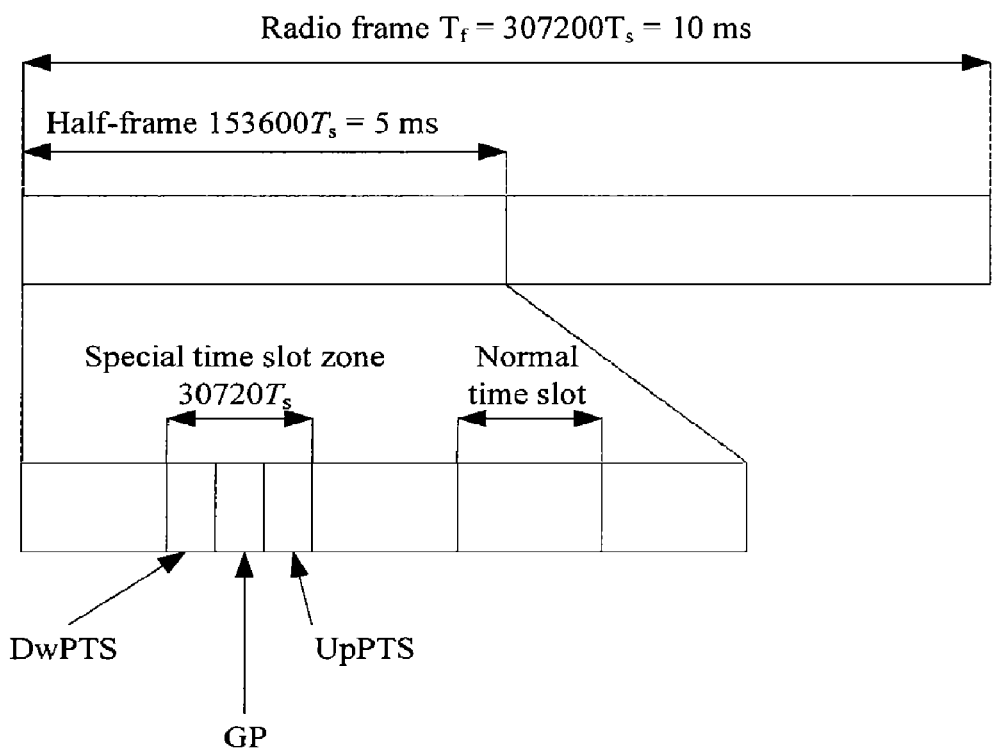
FIG. 17 is a schematic diagram of a fourth frame structure configured in the embodiment illustrated in FIG. 10.

Reference is made to FIG. 17 illustrating a schematic diagram of a fourth frame configured in the embodiment illustrated in FIG. 10, where a half-frame includes 4 normal time slots and one special time slot zone with the same length as that of the normal time slot. As illustrated in FIG. 17, a 5 ms half-frame is divided into 4 normal time slots with a length of 1 ms and 1 special time slot zone also with a length of 1 ms. The special time slot zone consists of the DwPTS, GP and UpPTS. The position of the special time slot zone may be configured flexibly through upper level signaling to support a varying proportion of time slots.

In such configuration of the frame structure, a normal time slot includes 14 OFDM symbols with short CPs or 12 OFDM symbols with long CPs, and specific parameters of the frame structure are as depicted in Table 3.

TABLE 3

| | Length of normal time slot | Number of symbols | CP length | Length of special time slot zone |
|---|---|---|---|---|
| Short CP | 30720 Ts (1 ms) | 14 | For the $0^{th}$~$1^{st}$ OFDM symbols, CP = 160 Ts (5.40 μs) For the $2^{st}$~$13^{th}$ OFDM symbols, CP = 144 Ts (4.69 μs) | 30720 Ts (1 ms) |
| Long CP | 30720 Ts (1 ms) | 12 | 512 Ts (16.67 μs) | |

Figure 18:
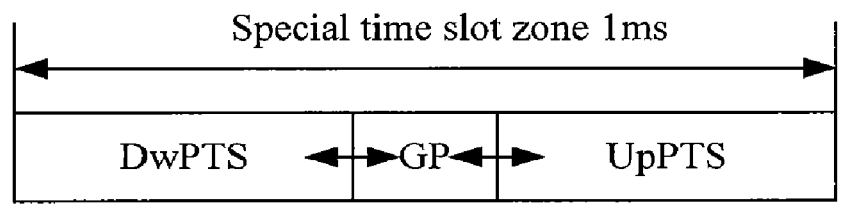
FIG. 18 is a schematic diagram of a special time slot zone configured in the frame structure illustrated in FIG. 17.

In such configuration of the frame structure, the structure of the special time slot zone is as illustrated in FIG. 18 illustrating a schematic diagram of the special time slot zone configured in the frame structure illustrated in FIG. 17, where the DwPTS, GP and UpPTS may be flexibly configured in length through upper level signaling to accommodate a varying coverage requirement while maintaining the total length of 0.5 ms of the special time slot zone.

As can be apparent, the transmission method in a Long Term Evolution Time Division Duplex system according to the invention may support flexibly a varying coverage area and improve the transmission efficiency of the system.

Figure 19:
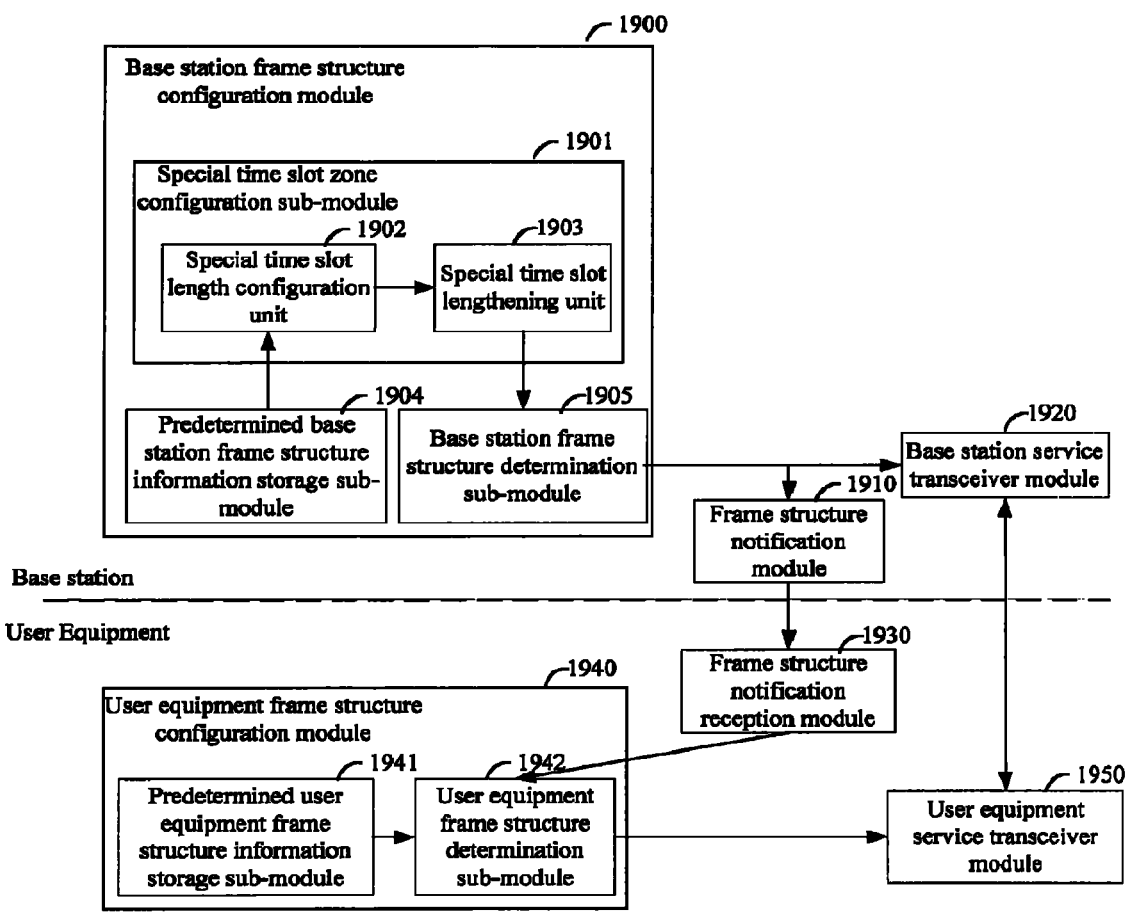
FIG. 19 is a schematic diagram illustrating structures of a base station and a User Equipment in the LTE TDD system according to an embodiment of the invention.

Moreover, the invention further provides an LTE TDD system corresponding to the foregoing method, which includes a base station and a User Equipment. Reference is made to FIG. 19 illustrating a schematic diagram illustrating structures of the base station and the User Equipment in the LTE TDD system according to an embodiment of the invention. In the present embodiment, the base station includes a base station frame structure configuration module 1900, a frame structure notification module 1910 and a base station service transceiver module 1920, and the User Equipment includes a User Equipment frame structure configuration module 1940, a frame structure notification reception module 1930 and a User Equipment service transceiver module 1950.

Particularly, the base station frame structure configuration module 1900 is configured to store predetermined configurations of a frame and determine the lengths of the Downlink Pilot Time Slot, the Guard Period and the Uplink Pilot Time Slot in the special time slot zone according to the predetermined configurations and a required coverage area of the system to determine the information of the frame structure of the radio frame for service transmission, and transmit the information of the frame structure to the frame structure notification module 1910 and the base station service transceiver module 1920.

The predetermined configurations comprise such configuration information that a half-frame of a radio frame for service transmission includes more than one normal time slot and at least one special time slot zone for transmitting the Downlink Pilot Time Slot, the Guard Period and the Uplink Pilot Time Slot, the Downlink Pilot Time Slot includes the primary synchronous channel, and the Uplink Pilot Time Slot includes the random access channel.

The frame structure notification module 1910 is configured to notify the User Equipment the information of the frame structure including the configured lengths of the Downlink Pilot Time Slot, the Guard Period and the Uplink Pilot Time Slot in the special time slot zone.

The frame structure notification reception module 1930 in the User Equipment is configured to receive the information of the frame structure transmitted from the frame structure notification module 1910 and transmit the information to the User Equipment frame structure configuration module 1940.

The User Equipment frame structure configuration module 1940 is configured to store the same predetermined configurations of the frame as that stored in the base station frame structure configuration module 1900, configure its own frame structure according to the predetermined configurations and the information of the frame structure transmitted from the frame structure notification reception module 1930, and transmit information of its own configured frame structure to the service transceiver module 1950 arranged at the User Equipment side.

The base station service transceiver module 1920 and the User Equipment service transceiver module 1950 perform service transmission in a frame with the configured frame structure.

In the present embodiment, the base station frame structure configuration module 1900 includes a predetermined base station frame structure information storage sub-module 1904, a special time slot zone configuration sub-module 1901 and a base station frame structure determination sub-module 1905.

The User Equipment frame structure configuration module 1940 includes a predetermined User Equipment frame structure information storage sub-module 1941 and a User Equipment frame structure determination sub-module 1942.

In FIG. 19, the predetermined base station frame structure information storage sub-module 1904 is configured to store the predetermined configurations of the frame and to provide the special time slot zone configuration sub-module 1901 with the predetermined configurations.

The special time slot zone configuration sub-module 1901 is configured to determine the structure of the special time slot zone and the lengths of the Downlink Pilot Time Slot, the Guard Period and the Uplink Pilot Time Slot therein according to the predetermined configurations and the required coverage area of the system.

The base station frame structure determination sub-module 1905 is configured to determine the structure information of the radio frame for service transmission according to the structure of the special time slot zone and the lengths of the Downlink Pilot Time Slot, the Guard Period and the Uplink Pilot Time Slot therein, and transmit the structure information to the frame structure notification module 1910.

The predetermined User Equipment frame structure information storage sub-module 1941 is configured to store the predetermined configurations of the frame and provide the frame structure determination sub-module 1942 arranged at the User Equipment side with the predetermined configurations.

The User Equipment frame structure determination sub-module 1942 is configured to configure its own frame structure according to the predetermined configurations and the information of the frame structure transmitted from the frame structure notification reception module 1930 to determine information of its own used frame structure, and transmit the information of its own configured frame structure to the service transceiver module 1950 arranged at the User Equipment side.

In FIG. 19, the special time slot zone configuration sub-module 1901 includes a special time slot length configuration unit 1902 and a special time slot lengthening unit 1903. Particularly, the special time slot length configuration unit 1902 is configured to determine the lengths of the Downlink Pilot Time Slot, the Guard Period and the Uplink Pilot Time Slot in the special time slot zone according to the predetermined configurations and the required coverage area of the system and provide the special time slot lengthening unit 1903 with the length information. The special time slot lengthening unit 1903 is configured to determine the structure and length information of the special time slot zone according to the predetermined information, lengthen the Downlink Pilot Time Slot and/or the Uplink Pilot Time Slot in the special time slot zone by a spared length of the special time slot zone under a condition of a small coverage area, and transmit the structure of the special time slot zone and the lengths of the Downlink Pilot Time Slot, the Guard Period and the Uplink Pilot Time Slot to the frame structure determination sub-module 1905.

As can be apparent from the foregoing embodiments, the transmission method, the base station and the User Equipment in an LTE TDD system according to the embodiments of the invention may support flexibly a varying coverage area and improve the transmission efficiency of the system.

The invention claimed is:

1. A transmission method in a Long Term Evolution Time Division Duplex system, comprising:
configuring the structure of a half-frame in a radio frame for service transmission in the system so that the half-frame comprises more than one normal time slot and at least one special time slot zone comprising a Downlink Pilot Time Slot, a Guard Period and an Uplink Pilot Time Slot;
determining the lengths of the Downlink Pilot Time Slot, the Guard Period and the Uplink Pilot Time Slot in the special time slot zone according to a required coverage area of the system to determine the structure of the radio frame for service transmission; and
performing, by the system, the service transmission in the determined radio frame,
wherein:
the half-frame is configured to comprise one special time slot zone and four normal time slots;
the lengths of the special time slot zone and each of the normal time slots are configured to be twice the length of a time slot in an existing frame structure type 1;
each of the normal time slots comprises 14 OFDM symbols in the case of short Cyclic Prefixes;
each of the normal time slots comprises 12 OFDM symbols in the case of long Cyclic Prefixes; and
the length of the special time slot zone is 1 ms and the length of each of the normal time slots is 1 ms in the case that the length of a time slot in the existing frame structure type 1 is 0.5 ms.

2. A transmission method in a Long Term Evolution Time Division Duplex system, comprising:
configuring the structure of a half-frame in a radio frame for service transmission in the system so that the half-frame comprises more than one normal time slot and at least one special time slot zone comprising a Downlink Pilot Time Slot, a Guard Period and an Uplink Pilot Time Slot;
determining the lengths of the Downlink Pilot Time Slot, the Guard Period and the Uplink Pilot Time Slot in the special time slot zone according to a required coverage area of the system to determine the structure of the radio frame for service transmission; and
performing, by the system, the service transmission in the determined radio frame,
wherein, the length of each of the normal time slots is configured to be identical to the length of a time slot in an existing frame structure type 1, the length of the special time slot zone is configured to be as n times the length of the time slot in the existing frame structure type 1, and the half-frame is configured to comprise 1 special time slot zone and a number 10−n of normal time slots, wherein 2≦n≦10.

3. The transmission method according to claim 2, wherein, the length of the special time slot zone is configured to be twice the length of the time slot in the existing frame structure type 1, and the half-frame is configured to comprise 1 special time slot zone and 8 normal time slots; wherein,
each of the normal time slots comprises 7 OFDM symbols in the case of short Cyclic Prefixes and each of the normal time slots comprises 6 OFDM symbols in the case of long Cyclic Prefixes; and
the length of the special time slot zone is 1 ms and the length of each of the normal time slots is 0.5 ms in the case that the length of the time slot in the existing frame structure type 1 is 0.5 ms.

4. The transmission method according to claim 1, wherein, the position of the special time slot zone in the half-frame is configured through upper level signaling.

5. A base station in a Long Term Evolution Time Division Duplex system, comprising a base station frame structure configuration module, a frame structure notification module and a base station service transceiver module;
the base station frame structure configuration module is configured to store predetermined configurations of a radio frame and determine the lengths of a Downlink Pilot Time Slot and an Uplink Pilot Time Slot in a special time slot zone in the radio frame according to the predetermined configurations and a required coverage area of the system so as to determine the structure information of the radio frame for service transmission, and is configured to transmit the structure information of the radio frame to the frame structure notification module and the base station service transceiver module;
the frame structure notification module is configured to notify a User Equipment of the structure information of the radio frame comprising the lengths of the Downlink Pilot Time Slot and the Uplink Pilot Time Slot in the special time slot zone; and the base station service transceiver module is configured to perform service transmission with the User Equipment in the radio frame, wherein:

the frame structure configuration module comprises a predetermined base station frame structure information storage sub-module, a special time slot zone configuration sub-module and a base station frame structure determination sub-module;

the predetermined base station frame structure information storage sub-module is configured to store the predetermined configurations of the radio frame, and to provide the special time slot zone configuration sub-module with the predetermined configurations;

the special time slot zone configuration sub-module is configured to determine the structure of the special time slot zone comprising the lengths of the Downlink Pilot Time Slot and the Uplink Pilot Time Slot therein according to the predetermined configurations of the radio frame and the required coverage area of the system; and the base station frame structure determination sub-module is configured to determine the structure information of the radio frame for service transmission according to the structure of the special time slot zone comprising the lengths of the Downlink Pilot Time Slot and the Uplink Pilot Time Slot therein and transmit the structure information of the radio frame to the frame structure notification module.

6. The base station according to claim 5, wherein, the special time slot zone configuration sub-module comprises a special time slot length configuration unit and a special time slot lengthening unit;

the special time slot length configuration unit is configured to determine the lengths of the Downlink Pilot Time Slot and the Uplink Pilot Time Slot in the special time slot zone according to the predetermined configurations of the radio frame and the required coverage area of the system, and is configured to transmit the length information to the special time slot lengthening unit; and the special time slot lengthening unit is configured to lengthen the Downlink Pilot Time Slot and/or the Uplink Pilot Time Slot in the special time slot zone according to the length information to determine the structure of the special time slot zone according to the predetermined configurations of the radio frame, and is configured to transmit the structure of the special time slot zone to the base station frame structure determination sub-module.

7. A User Equipment in a Long Term Evolution Time Division Duplex system, comprising a frame structure notification reception module, a User Equipment frame structure configuration module and a User Equipment service transceiver module;

the frame structure notification reception module is configured to receive the structure information of a radio frame comprising the lengths of a Downlink Pilot Time Slot and an Uplink Pilot Time Slot in a special time slot zone in the radio frame, and transmit the structure information of the radio frame to the User Equipment frame structure configuration module;

the User Equipment frame structure configuration module is configured to store predetermined configurations of a radio frame, configure the structure of the radio frame for service transmission according to the stored predetermined configurations of the radio frame and the received structure information of the radio frame, and transmit the configured structure of the radio frame to the User Equipment service transceiver module; and the User Equipment service transceiver module is configured to perform service transmission in the radio frame with the configured frame structure, wherein:

the User Equipment frame structure configuration module comprises a predetermined User Equipment frame structure information storage sub-module and a User Equipment frame structure determination sub-module;

the predetermined User Equipment frame structure information storage sub-module is configured to store the predetermined configurations of the radio frame structure, and provide the User Equipment frame structure determination sub-module with the predetermined configurations; and the User Equipment frame structure determination sub-module is configured to configure the structure of the radio frame for service transmission according to the predetermined configurations of the radio frame and the received structure information, which is received at the frame structure notification reception module, and transmit the configured structure of the radio frame to the User Equipment service transceiver module.

8. A method for providing a wireless communication in a Long Term Evolution Time Division Duplex system, comprising:

configuring the structure of a half-frame in a radio frame of an existing frame structure type 2 for service transmission in the system so that the length of a special time slot zone in the half-frame is configured to be 1 ms, wherein, the special time slot zone comprises a Downlink Pilot Time Slot, a Guard Period and an Uplink Pilot Time Slot;

determining the lengths of the Downlink Pilot Time Slot and the Uplink Pilot Time Slot in the special time slot zone according to a required coverage area of the system to determine the structure of the half-frame;

determining the structure of the radio frame for service transmission according to the structure of the half-frame;

transmitting information of the structure of the radio frame; and performing the service transmission in the determined radio frame.

9. The method according to claim 8, wherein, the half-frame is configured to comprise 4 normal time slots each with a length of 1 ms; and the special time slot zone in the half-frame is configured to be positioned between the position of the first normal time slot and that of the second normal time slot; wherein, each of the normal time slots comprises 14 OFDM symbols in the case of short Cyclic Prefixes; and each of the normal time slots comprises 12 OFDM symbols in the case of long Cyclic Prefixes.

10. The method according to claim 8, wherein, the half-frame is configured to comprise 8 normal time slots each with a length of 0.5 ms.

11. The method according to claim 10, wherein, the special time slot zone in the half-frame is configured to be positioned between the position of the second normal time slot and that of the third normal time slot; and each of the normal time slots comprises 7 OFDM symbols in the case of short Cyclic Prefixes; and each of the normal time slots comprises 6 OFDM symbols in the case of long Cyclic Prefixes.

12. The method according to claim 8, wherein, the half-frame refers to the first 5 ms half-frame in a radio frame of the existing frame structure type 2, or to both the first 5 ms half-frame and the second 5 ms half-frame in the radio frame.

13. A device for providing a wireless communication in a Long Term Evolution Time Division Duplex system, comprising:
- means for configuring the structure of a half-frame in a radio frame of an existing frame structure type 2 for service transmission in the system so that the length of a special time slot zone in the half-frame is configured to be 1 ms, wherein, the special time slot zone comprises a Downlink Pilot Time Slot, a Guard Period and an Uplink Pilot Time Slot;
- means for determining the lengths of the Downlink Pilot Time Slot, the Guard Period and the Uplink Pilot Time Slot in the special time slot zone according to a required coverage area of the system to determine the structure of the half-frame;
- means for determining the structure of the radio frame for service transmission according to the structure of the half-frame;
- means for transmitting information of the structure of the radio frame; and
- means for performing the service transmission in the determined radio frame.

14. The device according to claim 13, wherein, the half-frame is configured to comprise 4 normal time slots each with a length of 1 ms; and
- the special time slot zone in the half-frame is configured to be positioned between the position of the first normal time slot and that of the second normal time slot; wherein,
- each of the normal time slots comprises 14 OFDM symbols in the case of short Cyclic Prefixes; and
- each of the normal time slots comprises 12 OFDM symbols in the case of long Cyclic Prefixes.

15. The device according to claim 13, wherein, the half-frame is configured to comprise 8 normal time slots each with a length of 0.5 ms; and
- the special time slot zone in the half-frame is configured to be positioned between the position of the second normal time slot and that of the third normal time slot; wherein,
- each of the normal time slots comprises 7 OFDM symbols in the case of short Cyclic Prefixes; and each of the normal time slots comprises 6 OFDM symbols in the case of long Cyclic Prefixes.

* * * * *